US010859734B2

(12) United States Patent
Pelletier et al.

(10) Patent No.: US 10,859,734 B2
(45) Date of Patent: Dec. 8, 2020

(54) METHOD FOR FABRICATION OF A MULTIVARIATE OPTICAL ELEMENT

(71) Applicant: Halliburton Energy Services, Inc., Houston, TX (US)

(72) Inventors: Michael T. Pelletier, Houston, TX (US); Christopher Michael Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 186 days.

(21) Appl. No.: 16/153,323

(22) Filed: Oct. 5, 2018

(65) Prior Publication Data

US 2019/0041553 A1  Feb. 7, 2019

Related U.S. Application Data

(62) Division of application No. 13/984,420, filed as application No. PCT/US2011/024628 on Feb. 11, 2011, now Pat. No. 10,094,955.

(51) Int. Cl.
*G02B 5/00* (2006.01)
*G02B 27/00* (2006.01)
(Continued)

(52) U.S. Cl.
CPC ............... *G02B 5/00* (2013.01); *G02B 5/285* (2013.01); *G02B 27/0012* (2013.01); *G01J 3/10* (2013.01);
(Continued)

(58) Field of Classification Search
CPC ....... G02B 5/00; G02B 27/0012; G02B 5/285
(Continued)

(56) References Cited

U.S. PATENT DOCUMENTS 7,138,156 B1 *  11/2006  Myrick .................. G02B 5/285
                                                    427/10
7,411,729 B2 *  8/2008   Iyama .................... G02B 5/282
                                                    359/354
(Continued)

FOREIGN PATENT DOCUMENTS

WO   WO 2007/062202 A1   5/2007

OTHER PUBLICATIONS

Myrick, M.L.; et. al., Application of multivariate optical computing to simple near-infrared point measurements; 2002; SPIE; vol. 4574, pp. 208-215 (Year: 2002).*

(Continued)

*Primary Examiner* — Tahseen Khan
(74) *Attorney, Agent, or Firm* — Haynes and Boone, LLP (57) ABSTRACT

A method for fabricating an optical element including selecting a lamp spectrum and bandpass filter spectrum, obtaining a spectral characteristics vector to quantify the concentration of a component in a sample and obtaining a target spectrum from the lamp spectrum, the bandpass filter spectrum, and the spectral characteristics vector, is provided. Further including selecting a number of layers less than a maximum value, and performing an optimization routine using the index of refraction and thickness of each of the number of layers until an error between a model spectrum and the target spectrum is less than a tolerance value, or a number of iterations is exceeded. And reducing the number of layers if the error is less than a tolerance and stopping the procedure if the number of iterations is exceeded. A device using an optical element for optically-based chemometrics applications fabricated using the method above is also provided.

11 Claims, 5 Drawing Sheets

(51) Int. Cl.
*G02B 5/28* (2006.01)
*G01J 3/10* (2006.01)
*G01J 3/42* (2006.01)
*G01J 3/12* (2006.01)

(52) U.S. Cl.
CPC ......... *G01J 3/42* (2013.01); *G01J 2003/1213* (2013.01); *Y10T 428/24942* (2015.01)

(58) Field of Classification Search
USPC ........................................................ 428/212
See application file for complete search history.

(56) References Cited

U.S. PATENT DOCUMENTS

| | | | |
|---|---|---|---|
| 7,623,233 | B2 | 11/2009 | Freese et al. |
| 7,853,104 | B2 | 12/2010 | Oota et al. |
| 2002/0008215 | A1 | 1/2002 | Evans |
| 2004/0246493 | A1* | 12/2004 | Kim ................... G01B 11/0625 356/504 |
| 2006/0291061 | A1* | 12/2006 | Iyama .................... G02B 5/282 359/614 |
| 2007/0201136 | A1 | 8/2007 | Myrick |
| 2009/0073433 | A1 | 3/2009 | Myrick et al. |
| 2011/0176768 | A1* | 7/2011 | Singh ................... G02B 27/283 385/30 |

OTHER PUBLICATIONS

Zhang, L. et al.; Spectral tolerance determination for multivariate optical element design; Dec. 2001; Springer-Verlag; 369:351-355 (Year: 2001).*
European Examination Report for EP 13878297, 4 pages, dated May 4, 2017.
Myrick et al., Instrumentation for Air Pollution and Global Atmospheric Monitoring, Application of multivariate optical computing to simple near-infrared point measurements, 2002, pp. 208-215, Proceedings of SPIE vol. 4574.
Myrick, et al. "Application of Multivariate Optical Computing to Simple Near-Infrared Point Measurements," Proceedings of SPIE, vol. 4574, 2002, pp. 208-215.
Ozturk, et al., "Filtering Characteristics of Hybrid Integrated Polymer and Compound Semiconductor Waveguides," Journal of Lightwave Technology, vol. 30, No. 8, Aug. 2002, pp. 1530-1536.
PCT International Search Report and Written Opinion, dated Search Report: Apr. 11, 2011, 8 pgs.
Soyemi, et al. "Design and Testing of a Multivariate Optical Element: The First Demonstration of Multivariate Optical Computing for Predictive Spectroscopy." *Analytical Chemistry*. Mar. 15, 2001, pp. 1069-1079, vol. 73, No. 6.
The State Intellectual Property Office of People's Republic of China, The First Office Action, Jan. 27, 2015, 7 pages, China.

* cited by examiner

METHOD FOR FABRICATION OF A MULTIVARIATE OPTICAL ELEMENT

PRIORITY

The present application is a Divisional patent application of U.S. patent application Ser. No. 13/984,420, filed on Aug. 8, 2013, which is a U.S. National Stage patent application of International Patent Application No. PCT/US2011/024628, filed on Feb. 11, 2011, the benefit of which is claimed and the disclosures of which are incorporated herein by reference in their entirety.

BACKGROUND

1. Technical Field

Embodiments disclosed herein relate to the field of thin film optical devices. More particularly, embodiments disclosed herein are related to fabrication techniques and methods for using optical elements and optical computation elements in optical computation systems.

2. Description of Related Art

Multivariate Optical Elements (MOEs) are examples of optical computation elements that have been used in the past to perform optical analysis of fluids and material composition of complex samples. MOEs can be constructed by providing a series of layers having thicknesses and reflectivities designed to interfere constructively or destructively at desired wavelengths to provide an encoded pattern (waveform) specifically for the purpose of interacting with light and extracting an optical spectrum. The construction method for MOE's is similar to the construction method for an optical interference filter. For a complex waveform, an optical computation element constructed by conventional interference filter means may require many hundreds of layers. In addition to being complicated to make, such constructed MOEs may fail to perform adequately in harsh environments. For example, the down-hole in a drilling setup for oil exploration or extraction may include adverse temperature, shock, and vibration conditions that may affect the performance of MOEs having too many layers, with extremely tight tolerances.

What is needed is to provide simplified MOEs that can provide complex spectral characteristics with a significantly reduced number of layers. What is also needed are MOEs that perform properly in harsh environments such as encountered in oil exploration and extraction drilling.

SUMMARY

A method for fabricating an optical element according to embodiments disclosed herein may include selecting a lamp spectrum and a bandpass filter spectrum, obtaining a spectral characteristics vector to quantify the concentration of a component in a sample and obtaining a target spectrum from the lamp spectrum, the bandpass filter spectrum, and the spectral characteristics vector. The method may further include selecting a number of layers to be formed on the substrate of the optical element less than a maximum number of layers, and performing an optimization routine using the index of refraction and thickness of each of the number of layers until an error between a model spectrum and the target spectrum is less than a tolerance value, or a number of iterations is exceeded. Furthermore, some embodiments may include reducing the number of layers if the error is less than a tolerance and stopping the procedure if the number of iterations is exceeded to change the tolerance value.

According to some embodiments disclosed herein, a device using an optical element for optically-based chemometrics applications may include an optical element having a number of thin film layers formed on a substrate; wherein the number of thin film layers is less than a maximum number of layers, the maximum number selected according to a first tolerance. Further, in some embodiments the number of thin film layers is obtained by an optimization routine including the step of reducing the number of layers if an error between a model spectrum and a target spectrum is less than a second tolerance.

These and other embodiments will be described in further detail below, with reference to the following drawings.

BRIEF DESCRIPTION OF THE DRAWINGS

Wherever possible, the same reference numbers are used throughout the drawings to refer to the same or like elements.

DETAILED DESCRIPTION

Consideration of optical element construction with respect to the whole optical computation system provides a simplified design, whether in series or multiplexed in time. For instance, construction of optical elements may be simplified if other complimentary elements of a computation system are chosen properly. Absorption elements, holographic elements, optical fibers, or a plurality of MOEs in the optical computation system may be used to simplify the design of each of the optical elements.

The field of MOEs in chemometrics has been expanding rapidly recently, especially in the area of medical applications and in the pharmaceutical industry. Embodiments disclosed herein include methods for fabricating MOEs that may be used for oil exploration and extraction, in the down-hole environment.

Figure 1:
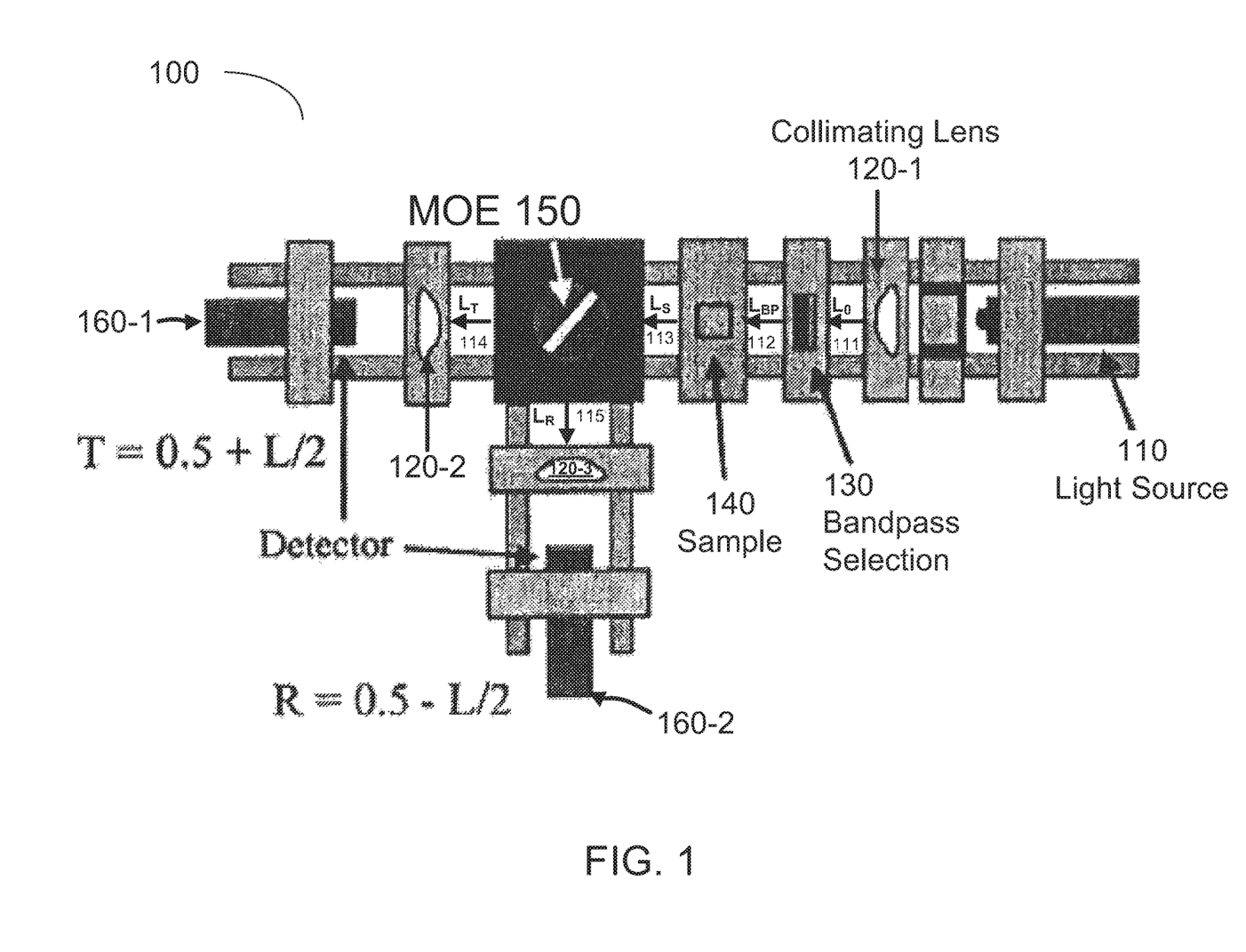
FIG. 1 shows a device using a Multivariate Optical Element (MOE) according to some embodiments.

FIG. 1 shows device 100 using MOE 150 fabricated using a method according to some embodiments. The principles of operation of device 100 are not dependent on the specific properties of MOE 150. Except for MOE 150, a device such as shown in FIG. 1 is described in Myrick, Soyemi, Schiza, Parr, Haibach, Greer, Li and Priore, "*Application of multivariate optical computing to simple near-infrared point measurements*," Proceedings of SPIE vol. 4574 (2002).

According to embodiments consistent with FIG. 1, light from light source 110 passes through collimating lens 120-1. Light coming out collimating lens 120-1, $L_0$ 111, has a specific wavelength component distribution, represented by a spectrum. Bandpass selection filter 130 transmits light LBP 112 by extracting a pre-selected portion of the wavelength components in $L_O$ 111. Light LBP 112 is passed through sample 140 which transmits light $L_S$ 113 into MOE 150. According to some embodiments, sample 140 may include a liquid having a plurality of chemical components dissolved in a solvent. For example, sample 140 may be a mixture of hydrocarbons including oil and natural gas dissolved in water. Sample 140 may also include particulates forming a colloidal suspension including fragments of solid materials of different sizes.

Sample 140 will generally interact with LBP 112, absorbing different wavelength components to a varying degree and letting other wavelength components pass through. Thus, light $L_S$ 113 has a spectrum $S(\lambda)$ containing information specific to the chemical components in sample 140. Spectrum $S(\lambda)$ may be represented as a row vector having multiple numeric entries, $S_i$. Each numeric entry $S_i$ is proportional to the spectral density of light $L_S$113 at a specific wavelength $\lambda_i$. Thus, entries $S_i$ are all greater than or equal to zero (0). Furthermore, the detailed profile of spectrum $S(\lambda)$ may provide information regarding the concentration of each chemical component within the plurality of chemicals in sample 140. $L_S$ 113 from sample 140 is partially transmitted by MOE 150 to produce light $L_T$ 114, which is measured by detector 160-1 after being focused by lens 120-2. A portion of light $L_S$ 113 is partially reflected from MOE 150 to produce light $L_R$ 115, which is measured by detector 160-2 after being focused by lens 120-3. In embodiments such as disclosed herein, MOE 150 may be an interference filter. Thus, MOE 150 may have certain spectral characteristic that can be expressed as row vector $L(\lambda)$. Vector $L(\lambda)$ is an array of numeric entries, $L_i$, such that the spectra of $L_T$ 114 and $L_R$ 115 is $$S_{L_T 114}(\lambda) = S(\lambda) \cdot (\tfrac{1}{2} + L(\lambda)), \quad (1.1)$$

$$S_{L_R 115}(\lambda) = S(\lambda) \cdot (\tfrac{1}{2} - L(\lambda)). \quad (1.2)$$

Note that the entries $L_i$ in vector $L(\lambda)$ may be less than zero, zero, or greater than zero. Thus, while $S(\lambda)$, $S_{LT}(\lambda)$, and $S_{LR}(\lambda)$ are spectral densities, $L(\lambda)$ is a spectral characteristic of MOE 150. From Eqs. (1.1) and (1.2) it follows that:

$$S_{L_T 114}(\lambda) - S_{L_R 115}(\lambda) = \tfrac{1}{2} S(\lambda) \cdot L(\lambda), \quad (2)$$

Vector $L(\lambda)$ may be a regression vector obtained from the solution to a linear multivariate problem targeting a specific component having concentration $\upsilon_i$ in sample 140. In such case, it follows that:

$$\kappa_i = \beta \cdot \sum_\lambda (S_{L_T 114}(\lambda) - S_{L_R 115}(\lambda)) + \gamma. \quad (3)$$

Where $\beta$ is a proportionality constant and $\gamma$ is a calibration offset. The values of $\beta$ and $\gamma$ depend on design parameters of device 100 and not on sample 140. Thus, parameters $\beta$ and $\gamma$ may be measured independently of the field application of device 100. Embodiments consistent with FIG. 1 have MOE 150 designed specifically to provide $L(\lambda)$ satisfying Eqs. (2) and (3), above. Thus, measuring the difference spectra between $L_T$114 and $L_R$115 the value of the concentration of the i-th component in sample 140 may be obtained. In some embodiments consistent with FIG. 1, detectors 160-1 and 160-2 may be single area photo-detectors. Single area photo-detectors 160-1 and 160-2 provide an integrated value of the spectral density. That is, if the signal from photo-detectors 160-1 and 160-2 is $d_{160-1}$ and $d_{160-2}$ respectively, Eq. (3) may be readjusted for a new calibration factor 13' as:

$$\kappa_i = \beta' \cdot (d_{160-1} - d_{160-2}) + \gamma. \quad (4)$$

Detectors 160-1 and 160-2 simply measure intensity over a detection bandwidth. The difference in signal between detectors 160-1 and 160-2 is proportional to the sum of $S(\lambda) \cdot L(\lambda)$ over the bandwidth of the system. Alternative embodiments measure T&R, T&S, or R&S. S is the sample spectrum, T is the transmitted spectrum and R is the reflected spectrum. With the Constraint T+R=S as a function of wavelength and hence as a sum, T may be measured as the transmittance of an MOE, R may be measured as the reflectance of an MOE, and S may be measured directly from the throughput of the sample. R may be approximated sufficiently via a complimentary MOE, or absorbance element, or holographic element. T may be approximated by an absorbance element or holographic element in the case that R is measured or approximated. S may be measured from a portion or split of the sample throughput beam.

According to some embodiments, MOE systems may perform partial spectrum measurements that are combined to obtain the desired measurement. Thus, multiple MOEs may be used to test for a plurality of components in sample 140 that may be of interest.

According to embodiments consistent with FIG. 1, MOE 150 may be an interference filter having a series of parallel layers 1 through K, each having a pre-selected index of refraction and a thickness. The number K may be any integer greater than zero. According to some embodiments, K may be equal to 25, but some embodiments may have values smaller than 25, or larger than 25.

Figure 2:
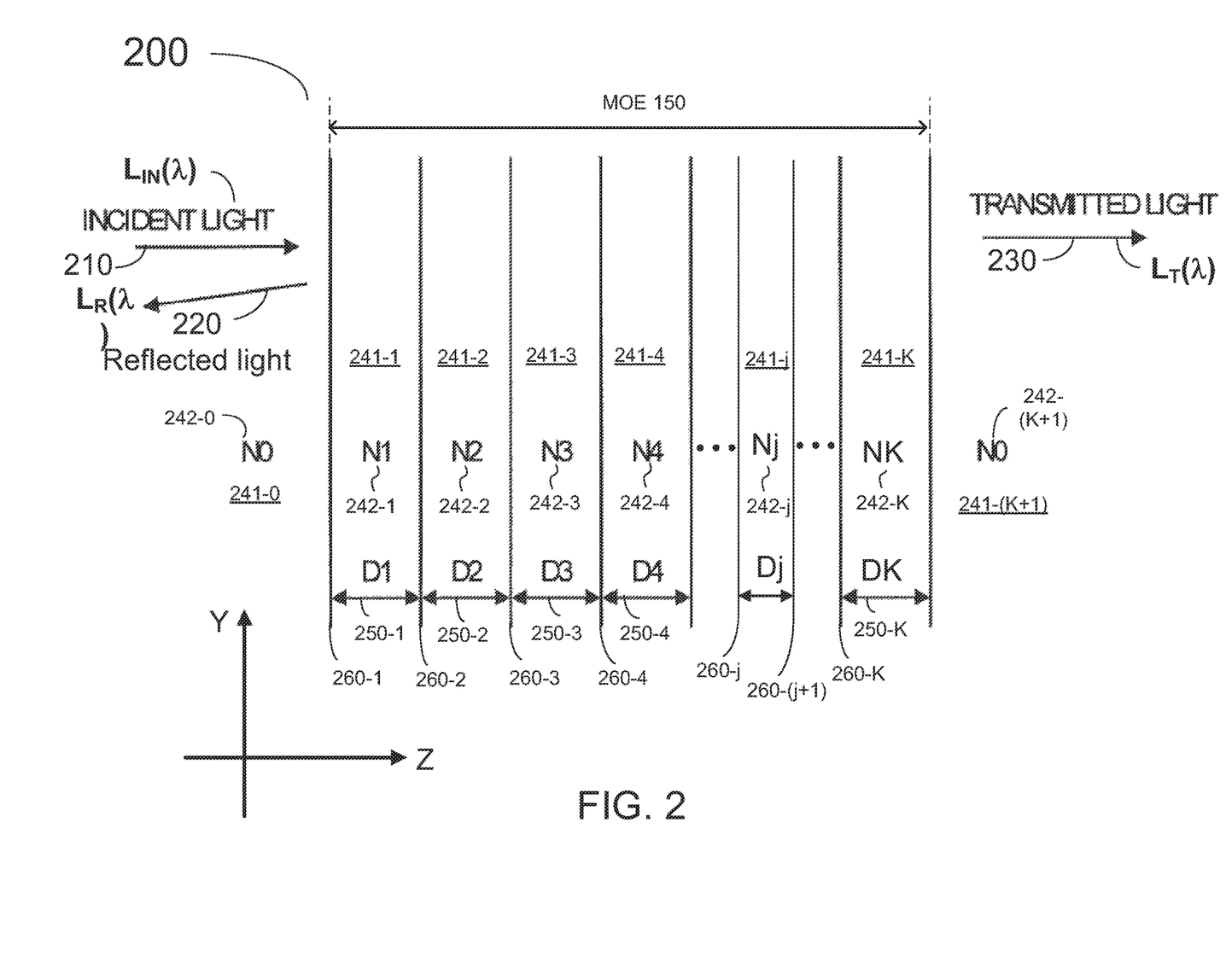
FIG. 2 shows the layers of a MOE fabricated using a method according to some embodiments.

FIG. 2 shows layers 241-1 through 241-K of MOE 150, fabricated using a method according to some embodiments. Layer 241-j, where j has a value from 1 to K, is included in MOE 150, according to FIG. 2. Input layer 241-0 and output layer 241-(K+1) are exterior layers on either side of MOE 150. Input layer 241-0 has index of refraction 242-0, and output layer 241-(K+1) has index of refraction 242-(K+1). According to FIG. 2, indices 242-0 and 242-(K+1) are equal to $n_0$. Some embodiments of device 100 (cf. FIG. 1) consistent with the concept illustrated in FIG. 2 may have index 242-0 different from 242-(K+1). Layers 241-1 through 241-K are formed of materials having refractive index 242-1 ($n_1$) through 242-K ($n_K$). Layers 241-1 through 241-K have thickness 250-1 ($D_1$) through 250-K ($D_K$). Also shown in FIG. 2 are interfaces 260-j separating layers j and j−1. Incident light $L_{in}(\lambda)$ 210, having wavelength $\lambda$ enters MOE 150 from input medium 241-0, travelling from left to right. Input medium 241-0 has refractive index 242-0 equals to $n_0$. Reflected light $L_R(\lambda)$ 220, having wavelength $\lambda$, is reflected from MOE 150 and travels from right to left according to FIG. 2. Transmitted light $L_T(\lambda)$ 230, having wavelength $\lambda$, traverses the entire body of MOE 150 and travels from left to right into output medium 241-(K+1). MOE 150 used in device 100 and fabricated according to methods disclosed herein may include any number of layers 241. For simplicity of illustration, FIG. 2 shows K layers of material 241-1 through 241-K. Some embodiments consistent with the concept in FIG. 2 may have any number, K. For example, MOE 150 may include one hundred layers (K=100), one thousand layers of material (K=1000), or more.

At interface 260-j, incident light $L_{in}(j, \lambda)$ travelling from left to right in FIG. 2 goes through a reflection/transmission process in accordance with the change in index of refraction 242. Thus, a portion of the incident light $L_{in}(j, \lambda)$ is reflected $L_R(j, \lambda)$ and a portion is transmitted $L_T(j, \lambda)$. The portion of reflected and transmitted light is governed by the principles of reflection/refraction and interference. The electric field of $L_{in}(j)$ may be denoted $E^+_j(\lambda)$, the electric field of $L_R(j, \lambda)$ may be denoted $E^-_j(\lambda)$, and the electric field of $L_T(j, \lambda)$ may be denoted $E^+_{j+1}(\lambda)$.

Reflection/refraction is governed by Fresnel laws, which for interface 260-$j$ determine a reflectivity coefficient $R_j$ and transmission coefficient $T_j$ as:

$$E_j^+(\lambda) = T_j(E_{j-1}^+(\lambda)), \quad (5.1)$$

$$E_j^-(\lambda) = R_j(E_{j-1}^+(\lambda)), \quad (5.2)$$

Reflectivity coefficient and transmission coefficient $T_j$ are given by:

$$T_j = \frac{2n_{j-1}}{n_j + n_{j-1}}, \quad (6.1)$$

$$R_j = \frac{n_{j-1} - n_j}{n_j + n_{j-1}}, \quad (6.2)$$

A negative value in Eq. (6.2) means that the reflection causes a 180 degree phase change in electric field. While more complex models can be adopted for light incident at an angle to the surface, Eqs. (5.1) and (5.2) assume normal incidence. Embodiments consistent with device 100 as illustrated in FIG. 1 may use a version of Eqs. (6.1) and (6.2) including an angle of incidence of approximately 45°. Eqs. (6.1), (6.2) and their generalization for different values of incidence may be found in J. D. Jackson, *Classical Electrodynamics*, John-Wiley & Sons, Inc., Second Edition New York, 1975, Ch. 7 Sec. 3 pp. 269-282. In general, all variables in Eqs. (5) and (6) may be complex numbers.

Note that a portion of radiation $L_R(j, \lambda)$ travels to the left in FIG. 2, towards interface $j-1$. At interface $j-1$, a subsequent reflection makes that portion of $L_R(j, \lambda)$ travel back towards interface $j$. Thus, a portion of $L_R(j, \lambda)$ makes a complete cycle through layer 240-$j$ and is added as a portion of $L_T(j, \lambda)$. This results in interference effects at interface 260-$j$. More generally, radiation portion $L_T(j, \lambda)$ travelling from left to right in FIG. 2 may include portions reflected a number of times, P, at any interface to the right of 260-$j$ (260-($j+1$) to 260-(K)), and reflected the same number of times, P, at any interface to the left of 260-$j$ (260-1 to 260-($j-1$)). Values of P may include zero and any positive integer. A value P=0 includes radiation that has been transmitted with no reflections from left to right in FIG. 2, from 260-1 through 260-$j$. Thus, radiation $L_T(j, \lambda)$ will present interference effects according to the different optical paths traveled for different values of P.

Likewise, radiation $L_R(j, \lambda)$ travelling from right to left in FIG. 2 may include portions reflected a number of times, M, at any interface to the right of interface 260-$j$ (260-($j+1$) to 260-K), and reflected a number of times, M−1, at any interface to the left of interface 260-$j$ (260-1 to 260($j-1$)). Values of M may include any positive integer. Radiation $L_R(j, \lambda)$ will present interference effects according to the different optical paths traveled for different values of M.

Reflection and refraction are wavelength dependent phenomena through refraction indices 242-$j$ ($n_j$) and 242-($j-1$) ($n_{j-1}$) (cf. Eqs. (6)). Furthermore, the optical path for field component $E_j^{+/-}(\lambda)$ through layer 241-$j$ is $(2\pi n_j/\lambda) \cdot D_j$. Thus, total optical paths for different values of P depend on wavelength, index of refraction 242-$j$ ($n_j$), and thickness 250-$j$ ($D_j$), for all j. Likewise, total optical paths for different values of M depend on wavelength, index of refraction 242-$j$ ($n_j$), and thickness 250-$j$ ($D_j$), for all j. Therefore, interference effects resulting in $L_T(j, \lambda)$ and $L_R(j, \lambda)$ are also wavelength dependent.

After a number of interfaces 260-$j$ for j=1 through K, energy conservation needs to be satisfied for each wavelength, $\lambda$. Therefore, spectral density, $S_{LT}(\lambda)$ of portion $L_T(\lambda)$ 230, and spectral density $S_{LR}(\lambda)$ of portion $L_R(\lambda)$ 220 satisfy:

$$S_{in}(\lambda) = S_{LT}(\lambda) + S_{LR}(\lambda), \quad (7)$$

Device 100 in FIG. 1 operates with MOE 150 adapted for reflection and transmission at approximately 45° incidence of $L_S$ 113. Some embodiments of device 100 may operate with MOE 150 adapted for any other incidence angle, such as 0°, as described by Eqs. (6.1) and (6.2). Regardless of the angle of incidence for MOE 150 used in device 100, Eq. (7) may still express conservation of energy in any such configuration.

According to embodiments disclosed herein, filter MOE 150 may not absorb any component of $L_S$ 113. In some embodiments, while a small portion of light may be absorbed by MOE 150 at certain wavelengths, the absorption may be negligible. Therefore, in such cases Eq. (7) may be approximately valid, to within a required specification tolerance.

A model of the spectral transmission and reflection characteristics of MOE 150 can be readily developed to estimate performance based on 242-$j$ ($n_j$) and 250-$j$ ($D_j$), for all layers involved (j). A readily adoptable approach is outlined in Chapter 8 of *Fundamentals of Geophysical Data Processing*, McGraw Hill, 1976, by Jon F. Claerbout. Other approaches specific to MOEs are outlined in U.S. patent application Ser. No. 11/684,779 entitled "Thin Film Interference Filter and Bootstrap Method for Interference Filter Thin Film Deposition Process Control" by Michael L. Myrick, filed on Mar. 12, 2007.

Figure 3:
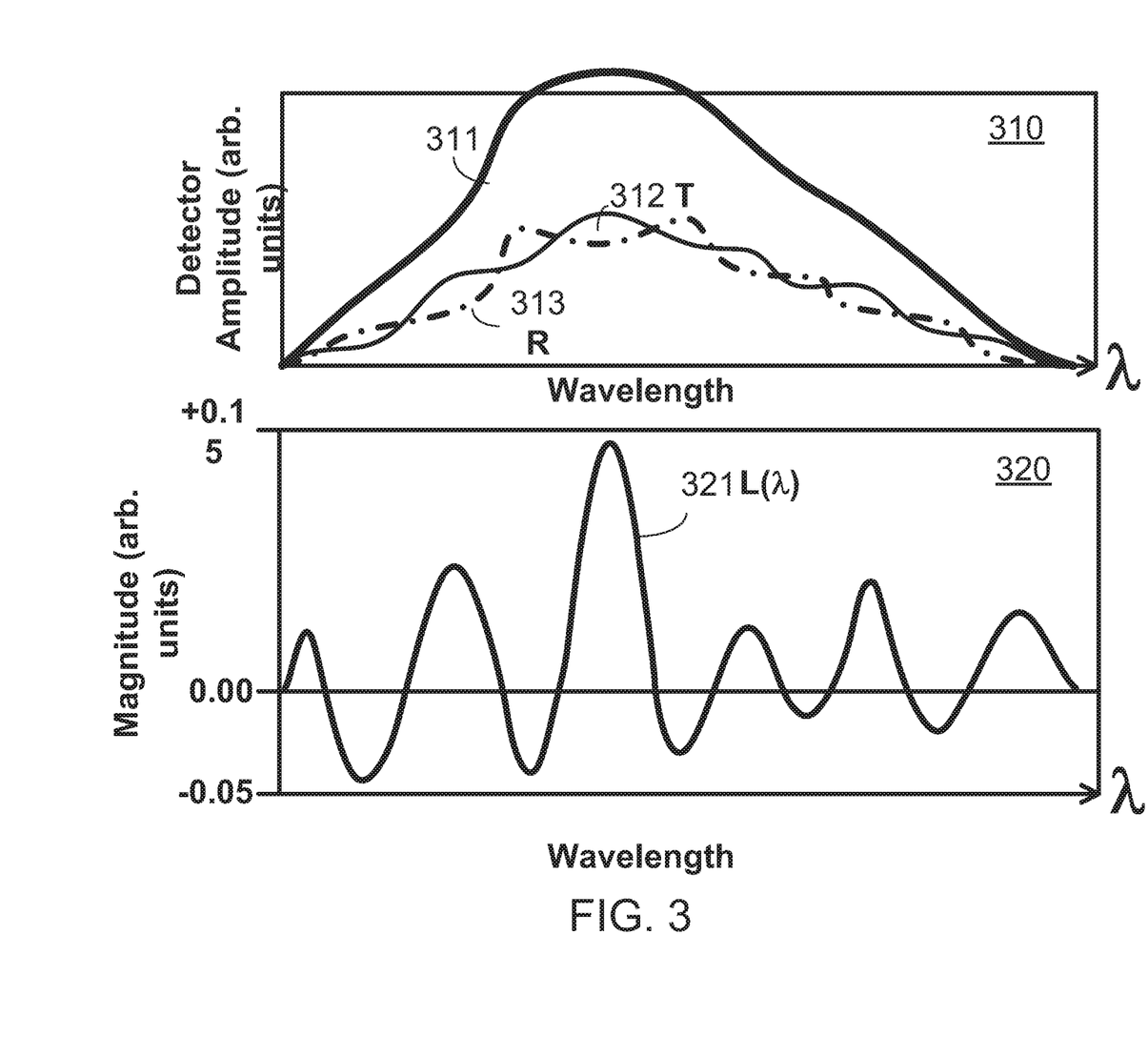
FIG. 3 shows a schematic view of spectra obtained with a MOE fabricated using a method according to some embodiments.

FIG. 3 shows a schematic view of spectra 310 and spectral characteristic 320, obtained with MOE 150, fabricated using a method according to some embodiments. Spectra 310 include spectral densities 311, 312 (T-transmission), and 313 (R-reflection). Spectral density 311 may correspond to LBP 112, before sample 140. In embodiments where sample 140 is absent, spectrum 311 may correspond to $S_{in}(X)$ (cf. Eq. (7)). Thus, density 311 may include spectral properties of light source 110 as it passes through the different optical elements in device 100, such as lens 120-1 and filter 130. Spectral density 312-T may include transmitted spectrum $S_{LT}(\lambda)$ (cf. Eq. (7) above) through MOE 150, when incident light LBP 112 passes through device 100 with no sample 140 present. Spectral density 313-R may include reflected spectrum $S_{LR}(\lambda)$ (cf. Eq. (7) above) through MOE 150, when incident light LBP 112 passes through device 100 with no sample 140 present.

According to embodiments consistent with FIG. 3, the sum of 312-T and 313-R may be approximately equal to 311. Spectral characteristic 320 may include curve 321, which is the difference between spectra 312-T and spectra 313-R (T-R), divided by the values of spectrum 311 at each wavelength. The ordinate axis in 320 may be proportional to a detector amplitude (cf. spectra 310), with the proportionality factor equal to β or β' (cf. Eqs. (4) and (5)). Spectral characteristic curve 321 ($L_{321}(\lambda)$) contains information specific to MOE 150. Light LBP 112 (cf. FIG. 1) may have spectral density $S_{LBP}(\lambda)$. Thus, curve 321 ($L_{321}(\lambda)$) may be obtained from 311, 312 and 313 by using Eqs. (1.1) and (1.2):

$$L_{321}(\lambda) = 2 \cdot \frac{S_{LT}(\lambda) - S_{LR}(\lambda)}{S_{LBP}(\lambda)}, \quad (8)$$

According to some embodiments of a method to fabricate MOE 150, values for 242-$j$ and 250-$j$ are adjusted such that for lamp 110, filter 130, and regression vector L($\lambda$), Eq. (8) is satisfied with regression vector L($\lambda$) being equal to $L_{321}(\lambda)$. As discussed above, regression vector L($\lambda$) may be obtained from the solution to a linear multivariate problem targeting a specific component in sample 140.

Figure 4:
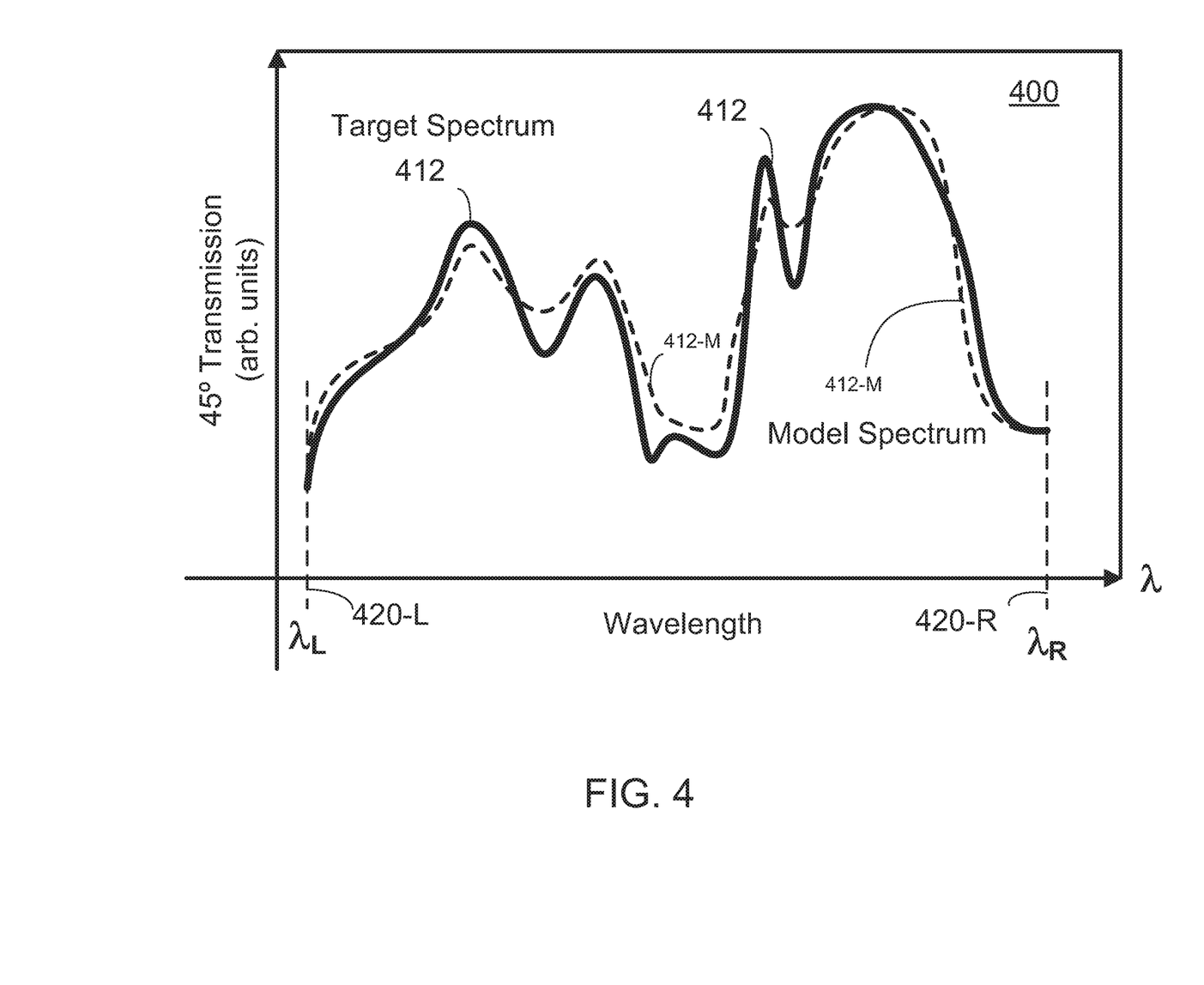
FIG. 4 shows a target transmission spectrum and an intermediate model transmission spectrum for a MOE fabricated using a method according to some embodiments.

FIG. 4 shows target transmission spectrum 412 and intermediate model transmission spectrum 412-M for MOE 150, fabricated using a method according to some embodiments. Spectrum 412 may be a spectrum such as 312-T (cf. FIG. 3). Thus, for a device 100 using lamp 110 and filter 130, vector $L_{321}(\lambda)$ obtained through Eq. (8) may be equal to regression vector L($\lambda$) when target spectrum 412 is used as $S_{LT}(\lambda)$. Note that in embodiments where the absorption of MOE 150 at all wavelengths is negligible, knowledge of spectrum 412 and spectrum 311 ($S_{LT}(\lambda)$) implies knowledge of spectrum 313-R since $$S_{LR}(\lambda) = S_{in}(\lambda) - S_{LT}(\lambda), \quad (9)$$

As can be readily seen from Eq. (7). According to FIG. 4, the modeling of MOE 150 according to Eqs. (5.1)-(6.2), and interference effects may include finding model spectrum 412-M (cf. FIG. 4). Spectrum 412-M may be obtained for a certain set of values $\{242\}_K$ and $\{250\}_K$, where K is the total number of layers in the model of MOE 150. The set $\{242\}_K$ is a set of K-values for the index of refraction of each layer T in MOE 150 (cf. FIG. 2). The set $\{250\}_K$ is a set of K-values for the thicknesses of each layer 'j,' in MOE 150 (cf. FIG. 2).

Also shown in FIG. 4 are left wavelength cutoff 420-L ($\lambda_L$), and right wavelength cutoff 420-R ($\lambda_R$). Cutoffs 420-L and 420-R are wavelength values that bound a wavelength range of interest for the application of device 100 (cf. FIG. 1). Accordingly, in embodiments such as shown in FIG. 4, it may be desired that model spectrum 412-M be approximately equal to target spectrum 412 for all wavelengths $\lambda$ satisfying $\lambda_L \leq \lambda \leq \lambda_R$.

As shown in FIG. 4, spectrum 412-M may be somewhat different from target 412. For example, for some wavelengths inside the range of interest curve 412-M may be higher than target 412. For other wavelengths inside the range of interest curve 412-M may be lower than target 412. In such situations, an optimization algorithm may be employed to vary the parameters in the sets $\{242\}_K$ and $\{250\}_K$ to find values rendering a spectrum 412-M closer to target 412. Sets $\{242\}_K$ and $\{250\}_K$ define a parameter space having 2K dimensions, referred to as $\{242\}_K \otimes \{250\}_K$.

The volume of parameter space $\{242\}_K \otimes \{250\}_K$ having 2K dimensions, may also be considered. For example, embodiments consistent with FIG. 2 (K=25), may include materials for layers 241 allowing the choice of 6 different indices of refraction $n_j$ 242-$j$ for each layer 241. Also, a total of 1000 different thicknesses $D_j$, 250-$j$, may be selected for each layer 241. This results in 2K-parameter space $\{242\}_K \otimes \{250\}_K$ having a volume of $(6*1000)^{25}$ possible design configurations. Therefore, optimization algorithms simplifying the optimization process may be used to scan this type of parameter space to find an optimal configuration for MOE 150.

Examples of optimization algorithms that may be used are nonlinear optimization algorithms, such as Levenberg-Marquardt algorithms. Some embodiments may use genetic algorithms to scan the parameter space and identify configurations for MOE 150 that best match target spectrum 412.

Some embodiments may search a library of MOE designs to find MOE 150 such that most closely matches target spectrum 412. Once MOE 150 is found closely matching target 412, the parameters in 2K-space $\{242\}_K \otimes \{250\}_K$ may be slightly varied to find an even better model spectrum 412-M.

According to embodiments consistent with FIGS. 1-4, the number of layers, K, may be included when evaluating an optimal design for MOE 150. Thus, the dimension of parameter space $\{242\}_K \otimes \{250\}_K$ may be an optimization variable according to some embodiments. Furthermore, as any other optimization variable, some embodiments may include constraints for variable K. For example, some applications of device 100 may benefit from having a fewer number of layers, K. Therefore, K may be set to be lower than a certain maximum value $K_{max}$. In such embodiments, the fewer the number of layers the better the predictability, precision, reliability and longevity of MOE 150 and device 100.

Figure 5:
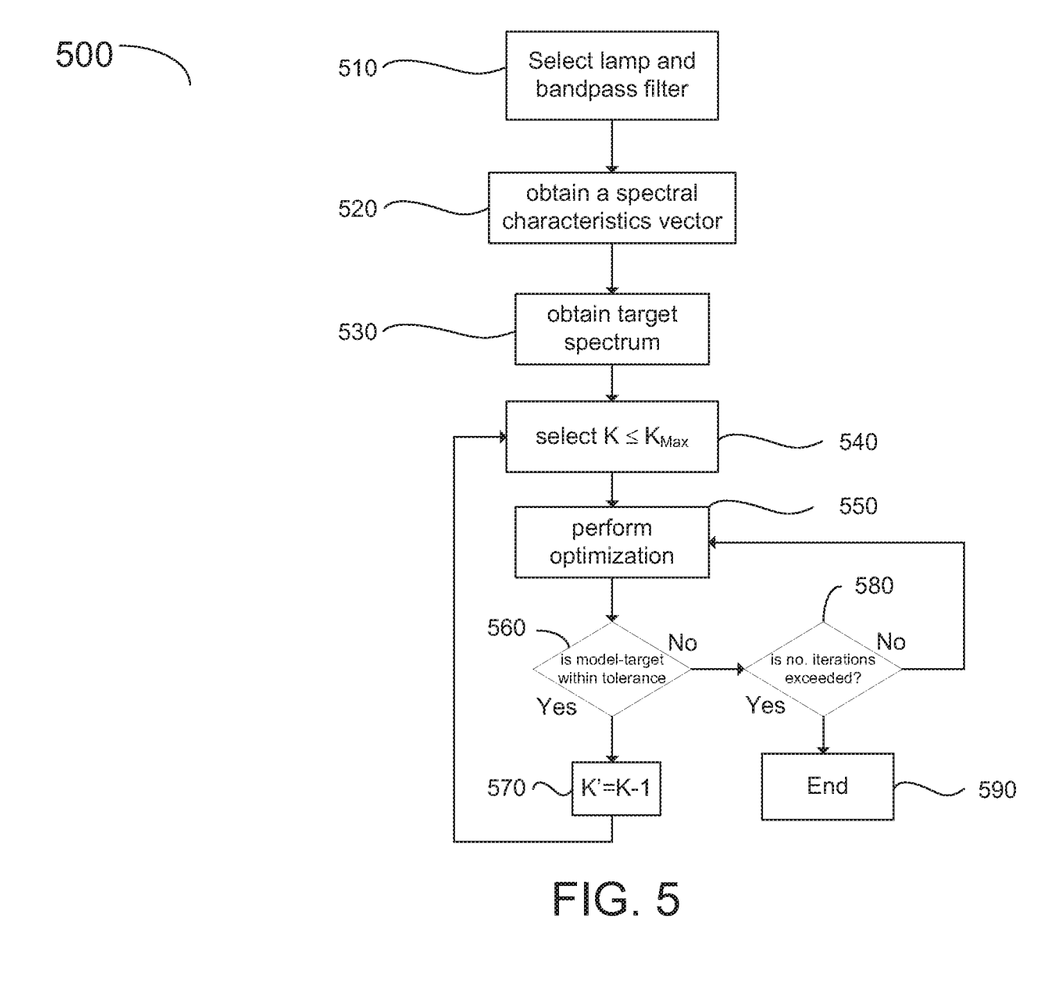
FIG. 5 shows a method for fabricating a MOE according to some embodiments.

FIG. 5 shows method 500 for fabricating MOE 150 according to some embodiments. According to some embodiments, method 500 may include selecting lamp spectrum and bandpass filter spectrum in step 510. Obtaining a spectral characteristics vector to quantify the concentration of a component in a sample in step 520. In some embodiments, the spectral characteristics spectrum may be such as curve 321 (cf. FIG. 3) equal to or approximately equal to a regression vector solving a linear multivariate problem.

Method 500 may further include obtaining a target spectrum from the lamp spectrum, the bandpass filter spectrum, and the spectral characteristics vector, in step 530. Selecting a number of layers, K, less than a maximum value $K_{max}$ in step 540. In some embodiments of method 500, K may define the dimensionality of parameter space $\{242\}_K \otimes \{250\}_K$ (cf. FIG. 2 and discussion above). Performing an optimization routine using the index of refraction and thickness of each of the number of layers in step 550 until an error between a model spectrum and the target spectrum is less than a tolerance value, as determined in step 560, or a number of iterations is exceeded, as determined in 580. An optimization routine in step 550 may be a nonlinear optimization routine used to scan parameter space $\{242\}_K \otimes \{250\}_K$ for MOE 150, as described above. For example, some embodiments of method 500 may include a Levenberg-Marquardt nonlinear optimization routine or a genetic algorithm, in step 550. Reducing the number of layers if the error is less than a tolerance in step 570. Stopping the procedure if the number of iterations is exceeded in step 590 to restart with new tolerance values in the optimization routine.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. A device using a plurality of optical elements for optically-based applications comprising:
   a multivariate optical element having a number of thin film layers formed on a single face thereof;

wherein the number of thin film layers is less than a maximum number of layers, the maximum number selected according to a first tolerance; and wherein the number of thin film layers is obtained by an optimization routine comprising:

reducing the number of layers if an error between a model spectrum and a target spectrum is less than a second tolerance, the optimization routine applying a first detector proportionality constant;

in response to the optimization routine, fabricating the optical element; and adjusting the first detector proportionality constant to a second detector proportionality constant, thereby calibrating the fabricated optical element.

2. The device of claim 1, wherein the plurality of optical elements comprises an absorption element.

3. The device of claim 1, wherein the plurality of optical elements comprises a holographic element.

4. The device of claim 1, wherein the plurality of optical elements comprises an optical fiber.

5. The device of claim 1, wherein the plurality of optical elements are multiplexed in time.

6. A multivariate optical element fabricated by a method comprising:

selecting a lamp spectrum and bandpass filter spectrum;

obtaining a spectral characteristics vector to quantify the concentration of a component in a sample;

obtaining a target spectrum from the lamp spectrum, the bandpass filter spectrum, and the spectral characteristics vector;

selecting a maximum number of layers to be formed on a single face of an optical element;

selecting a number of layers to be formed on the single face of the optical element less than the maximum number of layers;

performing an optimization routine by adjusting an index of refraction and thickness of each of the number of layers until an error between a model spectrum and the target spectrum is less than a tolerance value, or a number of iterations is exceeded, wherein the optimization routine applies a first detector proportionality constant;

reducing the number of layers if the error is less than the tolerance value;

stopping the procedure if the number of iterations is exceeded to change the tolerance value:

in response to the optimization routine, fabricating the optical element; and adjusting the first detector proportionality constant to a second detector proportionality constant, thereby calibrating the fabricated optical element.

7. The multivariate optical element of claim 6, wherein the optical element is an absorption element.

8. The multivariate optical element of claim 6, wherein the optical element is a holographic element.

9. The multivariate optical element of claim 6, wherein the optical element is an optical fiber.

10. The multivariate optical element of claim 6, wherein the concentration of the component in the sample may be quantified by:

obtaining a transmitted and reflected spectrum of the fabricated optical element;

subtracting the transmitted and reflected spectrums from one another to obtain a difference spectrum; and dividing the difference spectrum by the bandpass filter spectrum.

11. The method of claim 6, wherein the concentration of the component in the sample may be quantified by combining partial spectrums from multiple fabricated optical elements.

* * * * *